(12) United States Patent
Reppel et al.

(10) Patent No.: US 6,599,465 B1
(45) Date of Patent: Jul. 29, 2003

(54) COMPOSITE PART AND METHOD FOR PRODUCING THE SAME

(75) Inventors: Georg-Werner Reppel, Hammersbach (DE); Volker Zellmann, Linsengericht (DE)

(73) Assignee: Vacuumschemlze GmbH, Hanau (DE)

( * ) Notice: Subject to any disclaimer, the term of this patent is extended or adjusted under 35 U.S.C. 154(b) by 0 days.

(21) Appl. No.: 09/936,831

(22) PCT Filed: Mar. 8, 2000

(86) PCT No.: PCT/DE00/00726
§ 371 (c)(1),
(2), (4) Date: Dec. 21, 2001

(87) PCT Pub. No.: WO00/57436
PCT Pub. Date: Sep. 28, 2000

(30) Foreign Application Priority Data

Mar. 19, 1999 (DE) .......................... 199 12 470

(51) Int. Cl.⁷ .............................. B22F 7/00; B22F 7/04
(52) U.S. Cl. ...................... 419/5; 419/7; 419/8; 419/9; 148/101; 148/105
(58) Field of Search ................. 419/8, 5, 7, 9; 148/101, 105

(56) References Cited

U.S. PATENT DOCUMENTS 3,793,705 A    2/1974   Cole, III et al.
4,643,347 A    2/1987   Bronnes et al.
5,015,536 A    5/1991   Sweet et al.

FOREIGN PATENT DOCUMENTS

| CH | 612287 | 7/1979 | |
|---|---|---|---|
| DE | 764867 | 1/1945 | |
| DE | 852585 | 8/1952 | |
| DE | 869835 | 1/1953 | |
| DE | 877318 | 4/1953 | |
| DE | 2340018 | 1/1975 | |
| EP | 0326088 | 8/1989 | |
| JP | 362265712 A | * 11/1987 | ........... H01F/41/02 |

OTHER PUBLICATIONS

Abstract of Japanese Patent Document No. 62 264609 (Nov. 17, 1987).
Abstract of Japanese Patent Document No. 58 048608 (Mar. 22, 1983).
J.E. Geguzin. "Physik des Sinterns," pp. 110–117 and 274–279 (1973).

* cited by examiner

Primary Examiner—Daniel J. Jenkins
(74) Attorney, Agent, or Firm—Dean W. Russell; Kilpatrick Stockton LLP

(57) ABSTRACT

According to the inventive method for producing a composite part (4), a support body (1) is produced from a powder with a ferrous alloy base using powder metallurgy. A magnet body (2) which is based on an alloy that is rich in rare earths is applied to the support body (1) and both are then sintered in a furnace (1), whereby a solid joint is formed between the support body (1) and the magnet body (2).

13 Claims, 2 Drawing Sheets

COMPOSITE PART AND METHOD FOR PRODUCING THE SAME

This application claims priority to German Patent Application No. 199 12 470.1 filed on Mar. 19, 1999 and International Application No. PCT/DE00/00726 filed on Mar. 8, 2000.

The invention concerns a process for the production of composite parts, in which a magnet body made of an alloy rich in rare earths is bonded with a soft-magnetic support body along a boundary surface.

The invention further concerns a composite part with a magnet body based on an alloy rich in rare earths and a soft-magnetic support body.

These types of composite parts are, for example, used in electric motors as rotors or stators. For this purpose, the soft-magnetic support body serves as the magnetic return body for the magnet body. To produce these composite parts, a magnet body is first compacted from a powder based on an alloy rich in rare earths and then sintered. Due to the large reduction in volume during the sintering, this magnet body displays poor dimensional accuracy, so that after sintering it must be ground to measure. After grinding, the magnet body is glued to the soft-magnetic support body and assembled into rotors or stators of an electric motor.

A disadvantage of the known composite part and the known process is that an appropriate allowance must be reserved for the grinding of the magnet body. During the grinding away of this allowance, there is a large amount of waste. As a consequence, expensive material is thus wasted. In addition, the grinding waste produces disposal problems. Furthermore, the magnets must be presorted due to their warping, in order to keep the grinding costs within limits. Therefore, the grinding costs determine the magnet costs to a large degree, particularly when several surfaces have to be ground.

Proceeding from this prior art, the invention has as its object the creation of a dimensionally stable composite part of high strength made of a magnet body and a soft-magnetic support body and the indication of a simple and economical process for its production.

This object is achieved according to the invention in that a molten phase implemented along a boundary surface extends from the magnet body into the support body.

Furthermore, this object is achieved according to the invention by a process with the following process steps:

a) the support body and the magnet body are molded from powder, b) a molten phase is formed in the region of the boundary surface by a heat treatment which penetrates into the support body during the heat treatment The production of the support body using powder metallurgy leads to the support body having numerous pores and channels along the boundary surface, into which the molten phase present in the region of the boundary surface during the heat treatment can enter. The magnet body is effectively anchored in the support body after cooling by the molten phase which has penetrated into the magnet body. The anchoring of the magnet body in the support body is so strong in this case that the bond of the support body with the magnet body is maintained during the cooling after the joint sintering in spite of differing thermal expansion coefficients. Because there are numerous possibilities for designing the geometry of the support body and a high degree of dimensional accuracy of the composite part according to the invention is provided, the composite parts produced according to the invention can be assembled into complex electromechanical components through connectors or clamps directly after the heat treatment, without further grinding procedures.

Further embodiments and advantageous implementations of the invention are indicated in the dependent claims.

In the following, exemplary embodiments of the invention are explained in more detail with reference to the attached drawing.

Figure 1:
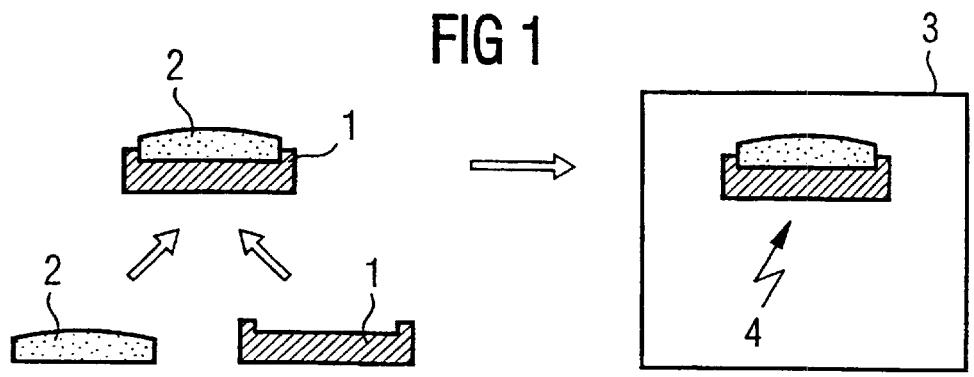
FIG. 1 shows a schematic illustration of a process cycle.

FIG. 1 shows a schematic illustration of a possible process cycle. A soft-magnetic support body 1 is compacted from an iron powder and then sintered. Furthermore, a magnet body 2 rich in rare earths is compacted from a powder, for example one based on a NdFeB alloy. During the compaction, an external magnetic field is applied in order to implement a magnetic orientation direction in the magnet body 2. The magnet body 2 is laid on the support body 1 and both bodies are jointly sintered into a composite part 4 in a furnace 3. However, it is also possible to mold the support body 1 and the magnet body 2 in a joint compaction procedure and then to sinter them jointly. Both methods are referred to in short in the following as solder sintering.

Figure 2:
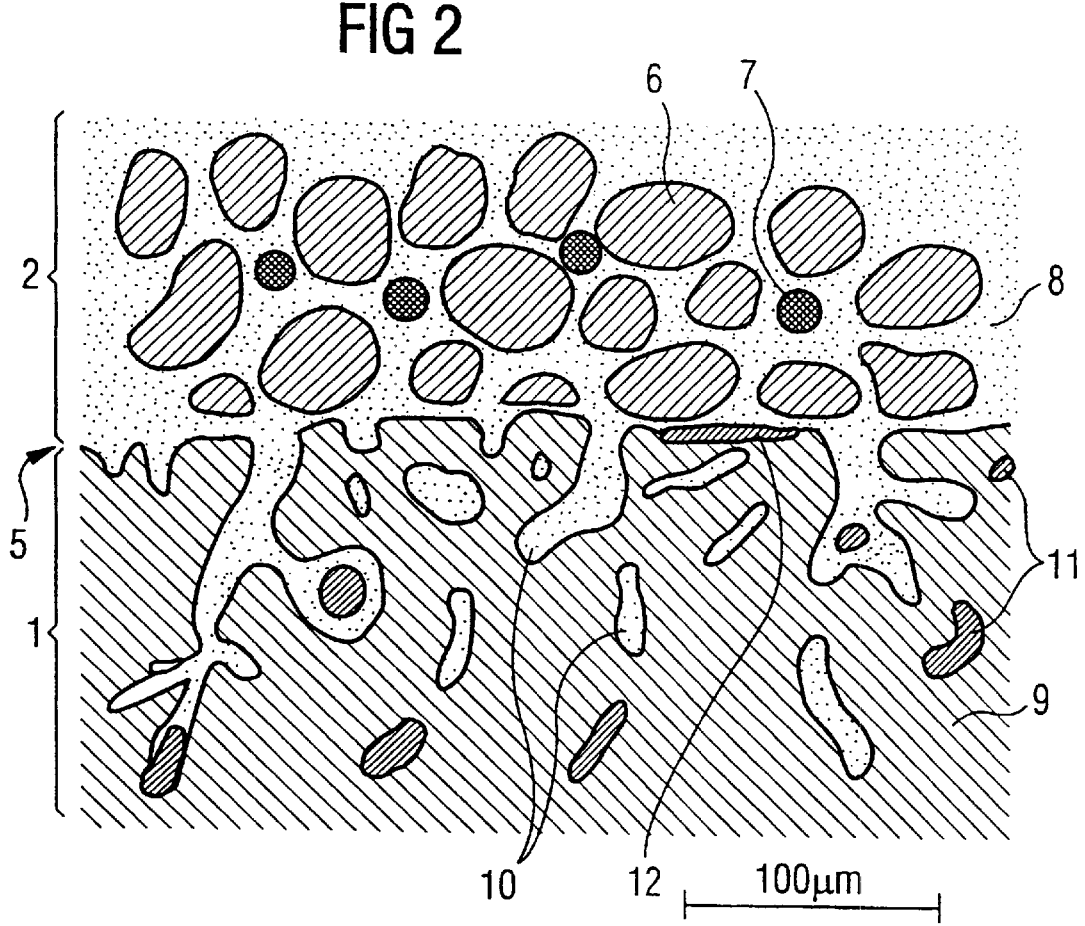
FIG. 2 shows a section through a boundary surface between a magnet body and a support body.

FIG. 2 shows a section through a boundary surface 5 between the support body 1 and the magnet body 2 of the composite part 4 after the solder sintering. The magnet body 2 is composed of hard magnetic grains 6 with the composition $Nd_2Fe_{14}B$ and of Nd—Fe borides 7, between which a Nd-rich phase 8 is located, which enters the molten state at temperatures above approximately 650° C. These types of alloys are also referred to in short as alloys based on NdFeB.

The support body 1 compacted from iron powder and sintered has, in addition to massy regions 9, pore channels 10, which are partially filled with the Nd-rich phase 8 of the magnet body 2 after the solder sintering. In addition to the pore channels 10 filled with the Nd-rich phase 8, cavities 11 are also present which are not filled by the Nd-rich phase 8. In addition, individual cracks 12 could also be present.

Because the Nd-rich phase 8 penetrates into the pore channels 10 of the support body 1, the magnet body 2 is effectively anchored in the support body 1. The bond is strong enough in this case that, in spite of the differing sintering behavior and differing thermal expansion of the two materials, the bond does not break apart during the heat treatment.

Figure 3:
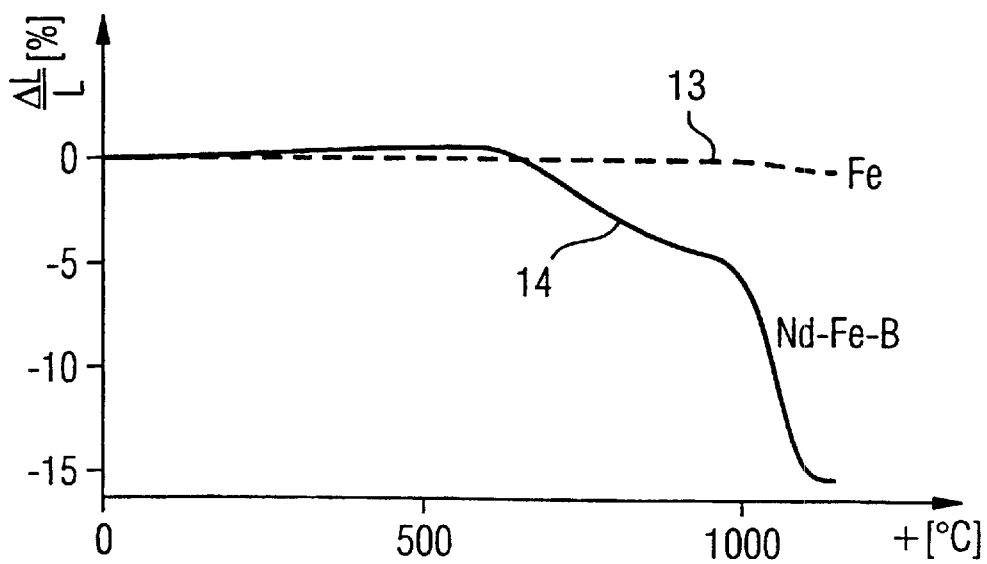
FIG. 3 shows a diagram in which the percentage change in length of a magnet body based on NdFeB and a support body made of Fe is plotted.

FIG. 3 illustrates, depending on the sintering temperature, the percentage change in length of a support body 1 produced from iron powder with a dashed line 13, as well as the percent change in length of a magnet body 2 produced on the basis of a NdFeB alloy with a solid line 14. This relationship is significant during the heating-up phase in sintering. At a sintering temperature of 1120° C. in a reducing atmosphere, the contraction of the support body 1 made of iron is only 0.1%. In contrast, for a NdFeB alloy, the contraction is typically 12% perpendicular to the magnetic orientation direction and 22% parallel to the magnetic orientation direction, which corresponds to a contraction of 15.4% averaged over the three spatial directions. The linear change of the dimensions due to the volume contraction of the magnet body 2 is obviously possible in that the magnet body 2 can glide almost freely on a lake of molten phase at the high temperatures obtaining during the solder sintering.

Figure 4:
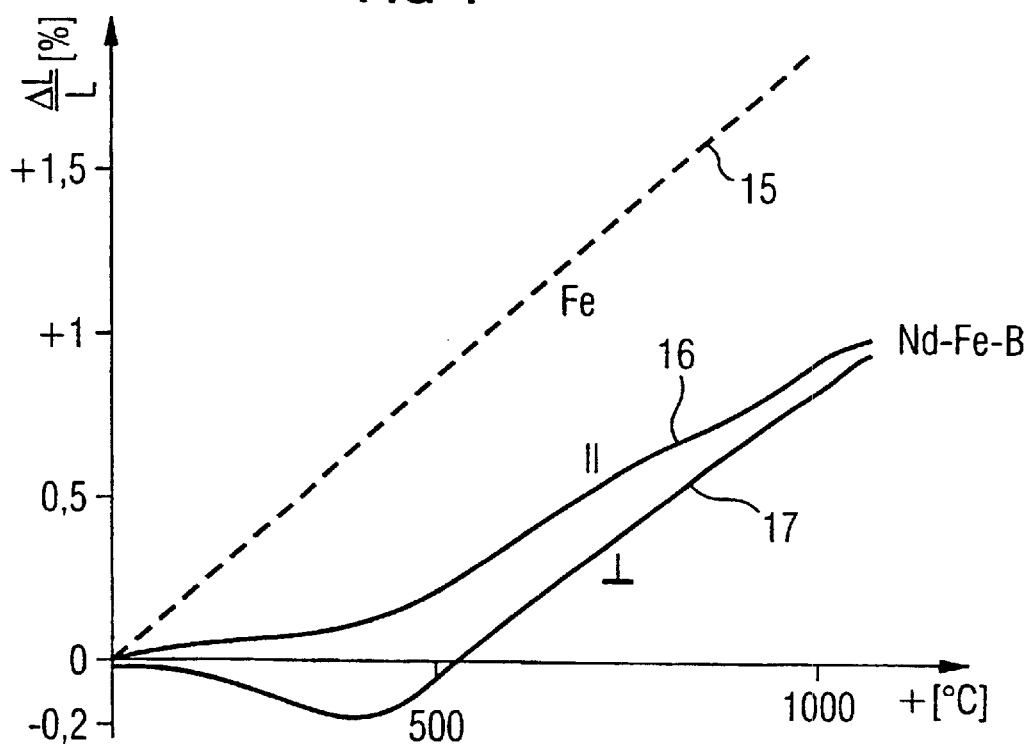
FIG. 4 shows a diagram in which the relative change in length of the magnet body based on NdFeB and a support body made of Fe is plotted relative to the temperature.

The differing expansion behaviors during temperature changes illustrated in FIG. 4, for example in the cooling phase of a composite body with a magnet body based on NdFeB and a magnet body [sic] made of Fe, are significantly more serious. In FIG. 4, the dashed line 15 indicates the relative change in length of the support body 1 depending on the temperature. The solid curve 16 in FIG. 4 describes the expansion behavior of the magnet body 2 made of NdFeB parallel to the magnetic orientation direction, while the solid line 17 describes the expansion behavior of the magnet body 2 made of NdFeB perpendicular to the magnetic orientation direction. It can be seen from FIG. 4 that the support body 1 expands approximately linearly with increasing temperature, while in contrast the magnet body 2 produced from a NdFeB alloy contracts in the direction perpendicular to the magnetic orientation direction up to a temperature of approximately 375° C., and then expands again at higher temperatures. The magnet body 2 produced from a NdFeB alloy only expands continuously parallel to the magnetic orientation direction. However, below a temperature of 500° C., the thermal expansion of the magnet body 2 produced from NdFeB is significantly weaker than the expansion of the support body 1 produced from an iron powder. The fact that the bond between the support body 1 and the magnet body 2 is not broken apart in spite of these differing expansion behaviors during cooling is in itself an indication of the quality of the joint achievable between the support body 1 and the magnet body 2 with this process. It is possible that the tensions arising during cooling of the composite part 4 are absorbed by plastic deformations in the iron of the support body 2.

In spite of the greatly differing material properties, a solid bond between the magnet body 2 and the soft-magnetic support body 1 is achieved if a sufficient quantity of molten phase, which bonds with the support body 1, is provided at the boundary surface 5. This can occur in one way through appropriate alteration of the alloy composition of the magnet body 2, whereby the amount of molten phase is increased. Another possibility is the application of a special solder material onto the boundary surface before the sintering of the magnet body 2.

In the following exemplary embodiments described in more detail, good permanent-magnetic and soft-magnetic properties are achieved. The composite parts 4 achieved through joint heat treatment are so dimensionally accurate that in general no finishing is necessary. This is even more surprising because molten phase sintered molded parts, such as molded parts based on NdFeB, have a large amount of distortion, while typical powder metallurgy molded parts based on iron which are sintered at the same temperature still maintain the very precise compaction tolerances. During joint sintering of the magnet body 2 on the soft-magnetic support body 1, however, no or only insignificant distortion of the magnet body 2 occurs, so that machining of the composite part 4 can be dispensed with. The assembly of the composite parts 4 is simplified and thereby saves costs relative to the current technology.

The production of the composite parts 4 will now be described with reference to the following exemplary embodiments:

The examples described in the following share the feature that first a support body 1 with dimensions of 22.3×6.9×4 mm was compacted from pure iron powder with particles having an average diameter of 100 μm. The support body 1 molded in this way was subsequently sintered in a reducing $H_2/N_2$ atmosphere at 1120° C. The compaction and sintering densities were between 6.32 and 7.13 g/cm³, depending on the mold pressure selected. This corresponds to 80.5% and 91% of the theoretical density of iron.

The following examples also share the feature that the solder sintering was performed at temperatures between 1080 and 1145° C., with high sintering temperatures having been shown to have more favorable tendencies.

EXAMPLE 1

A NdFeB powder with 30.5% rare earths was mixed with 3% of a neodymium hydride powder ($NdH_2$), oriented in the magnetic field, and compacted into a parallelepiped-shaped magnet body 2. Subsequently, the green compact was placed on a sintered support body 1 of the same size made of iron with a density of 6.95 g/cm³. The sintering of the composite body under vacuum and noble gas at 1100° C. for 1 hour in the typical way for the magnet body 2 followed. After this solder sintering, the magnet body 2 had contracted by 10 to 25%, depending on the orientation of the magnetic orientation direction, while the dimensions of the support body 1 made of pure iron remained unchanged. The magnet body 2 had geometrically adjusted itself to the support body 1 and had formed a strong bond having a high shear strength with it via an intermediate layer made of rare earths and iron. Because the magnet body 2 did not experience any distortion in regard to the thickness corresponding to the orientation direction, the thickness of the composite part 4 was provided with a tolerance of approximately ±0.1 mm or even ±0.05 mm, so that grinding could be dispensed with.

It is to be noted that magnets sintered in typical processes require an allowance of approximately 0.5 mm due to the sintering distortion, which corresponds to approximately 20% of the thickness. This allowance then has to be removed by grinding to the final thickness.

EXAMPLE 2

As in example 1, but with admixture of 1% $NdH_2$-rare earth.

EXAMPLE 3

As in example 1, but with admixture of 5% $NdH_2$-rare earth.

EXAMPLE 4

As in example 1, but with admixture of 10% $NdH_2$-rare earth.

EXAMPLE 5

Comparative example: as in example 1, but with no admixture of rare earth.

The strength of the bond between the magnet body 2 and the support body 1 made of Fe was tested by striking on a stone slab.

The number of strongly bonded parts from each 10 composite parts was determined.

The results are summarized in the table.

Table 1

[headings from left to right]
Example
  Increased rare earths admixture (%)
  Nd-rich phase at approximately room temperature (%)

Number of bonded parts after sintering

Number of bonded parts after striking

[see original for numbers]

With elevated content of rare earths, the amount of molten phase during sintering, and therefore the quality of the bond, increases. The quantity of the phase rich in rare earths can be controlled via various measures from melt and powder metallurgy; the addition of a powder rich in rare earths is only one possibility. Further possibilities are mentioned in the following examples.

To examine the magnetic properties, a composite part 4 was separated and the magnet body 2, to which 5 weight percent $NdH_2$ was added during production, was measured in a Permagraph. The remanence of 0.96 T was, due to the larger concentration of Nd, 2 to 3% lower than the remanence of NdFeB magnets produced in the typical way, without increased content of rare earth.

The coercive field strength was above 16 kA/cm for the magnet body 2 measured. A slight improvement of the coercive field strength resulted relative to the alloy without admixture.

The support body 1 made of iron had a coercive field strength of 1.05 A/cm in the initial state. After the solder sintering, the coercive field strength was 1.52 A/cm.

EXAMPLE 6

As in example 1: in addition, the compacted magnet body 2 was painted with a dispersion of $NdH_2$ powder in ethanol before it was placed on the carrier body 1 made of Fe. An incomplete demagnetization of the magnet body 2 is helpful for joining the two bodies. After sintering, 9 of 10 parts were strongly bonded to one another after the test by striking.

EXAMPLE 7

A sintered support body 1 made of iron was placed in the compaction mold, and overfilled with Nd—Fe—B powder, to which 5% $NdH_2$ was admixed. After orientation of the powder, the two materials were compacted jointly. The composite part 4 produced in this way was subsequently sintered at temperatures of 1100° C. After sintering, the magnet body 2 and the support body 1 had formed a tight bond. The pore channels 10 in the support body 1 were filled by the Nd-rich molten phase to a depth of 0.5 to 1 mm with the Nd-rich phase 8 of the magnet body 2, which was molten at the sintering temperatures. A 50 µm wide Nd-poor zone did thereby arise in the magnet body 2, but this did not influence the magnetic properties of the magnet body 2.

In these samples, the mechanical clamping between the magnet body 2 and the support body 1 was already so strong after compaction that a distortion and a trapezoidal cross-section of the magnet body 2 resulted after the solder sintering.

Because of this, the strength of the joint is extraordinarily high. This is shown in that cracks 12 frequently appeared in the magnet body 2. Obviously, the bond between the magnet body 2 and the support body 1 is so good that the tensions occurring due to the differences in the thermal expansions lead to a crack in the magnet body 2 rather than one in the intermediate layer.

EXAMPLE 8

Iron powder was poured into the mold and precompacted with a mold pressure of 3 t/cm². Subsequently, the mold was overfilled with Nd—Fe—B powder. After orientation of the powder, the two materials were jointly compacted at 4 t/cm².

After sintering, the magnet body 2 and the support body 1 had formed a tight bond.

These experiments show that a significant excess of rare earths in the region of the boundary surface is essential for a joint with high shear strength.

EXAMPLES 9 to 11

A magnet body 2 was compacted from NdFeB powder in the presence of an external magnetic field. Subsequently, a solder was applied to the boundary surface 5 and the support body 1 and the magnet body 2 were sintered at 1100° C. A 1 mm thick disk made of Nd metal, Nd shavings, and fine $NdH_2$ powder was particularly used as the solder.

Strong bonds between the support body 1 and the magnet body 2 also resulted from these experiments.

EXAMPLE 12

As in example 1: in addition, an aluminum foil was placed between the magnet body 2 and the support body 1. After sintering, 5 of 10 composite parts 4 were strongly bonded to one another after the test by striking. Al increased the amount of molten phase during the sintering and thus allowed the bonding of the two materials. In addition, neither the soft-magnetic properties of the support body 1 nor the magnetic properties of the magnet body 2 were significantly affected by Al.

EXAMPLES 13 to 16

As in the preceding example, but instead of the Al foil, Al powder, ferro boron powder, silver powder, and NdFeB powder with a rare earth content of 42% were each powdered onto the support body 1 before the joint sintering. In all cases, the bond between the magnet body 2 and the support body 1 was improved.

EXAMPLE 17

Carbonyl iron powder with a particle size of 3 µm was sprinkled on a shell-shaped support body 1 made of sintered iron. A compacted magnet body 2, also shell-shaped and made of a permanent magnet alloy of the type $Sm_2(Cu, Zr, Fe, Co)_{17}$, was placed on this iron powder layer and the composite part 4 was sintered at 1210° C. under vacuum. After heat treatment and cooling, the magnet body 2 was strongly bonded with the support body 1.

EXAMPLE 18

Comparative example, as in example 17, but without the Fe powder intermediate layer. After sintering and light striking on a base, the two bodies were separated.

$Sm_2(Cu, Zr, Fe, Co)_{17}$ is also a molten phase sintered material. The iron powder used in the intermediate layer diffused into the magnetic material and increased the amount of molten phase during the sintering.

Finally, it is to be noted that, in place of pure iron, further iron alloys which have a sufficient porosity in production using powder metallurgy methods could also be considered for the support body 1. For example, iron-phosphorus alloys with a weight proportion of phosphorus <1%, iron-nickel alloys with a weight proportion of nickel <85%, iron-cobalt alloys with a weight proportion of cobalt <55%, and iron-silicon alloys with a weight proportion of silicon <7% could be considered.

Furthermore, it is to be noted that other alloys containing rare earths could be used in place of the magnet body 2 made of NdFeB. For example, Nd can be replaced by further rare earths such as Pr or Dy, and Fe by other transition metals such as Co or Ni.

What is claimed is:

1. A process for the production of composite parts, in which a magnet body made of an alloy rich in rare earths is bonded along a boundary surface with a soft-magnetic support body, comprising:
    a) molding the support body and the magnet body from powder;
    b) forming a molten phase in the region of the boundary surface by a heat treatment, which penetrates into the support body during the heat treatment.

2. The process according to claim 1, wherein the support body is compacted and sintered from powder based on a soft-magnetic iron alloy.

3. The process according to claim 1, wherein the support body is compacted and sintered from pure iron powder.

4. The process according to claim 1, wherein the magnet body is produced from an alloy based on NdFeB.

5. The process according to claim 4, wherein a proportion of the phase rich in rare earths in the magnets is at least 3% without hard-magnetic phase of the type $Nd_2Fe_{14}B$.

6. The process according to claim 4, wherein an increased proportion of the phase rich in rare earths is achieved by admixture of a powder with at least 35 weight-percent proportion of rare earths.

7. The process according to claim 6, wherein the heat treatment of the composite part occurs simultaneously with the sintering of the magnet body.

8. A process for the production of composite parts, in which a magnet body made of an alloy rich in rare earths is bonded along a boundary surface with a soft-magnetic support body, comprising:
    a) molding the support body and the magnet body from powder; and
    b) forming a molten phase in the region of the boundary surface by a heat treatment, which penetrates into the support body during the heat treatment, wherein a solder with a melting point below the heat treatment temperature is applied along the boundary surface before the heat treatment.

9. The process according to claim 8, wherein the solder is applied onto the boundary surface in the form of a powder with at least 35 weight-percent rare earths.

10. The process according to claim 8, wherein the solder is applied to the boundary surface in the form of a foil whose melting point is below the heat treatment temperature.

11. The process according to claim 1, wherein the magnet body and support body are compacted jointly.

12. The process according to claim 1, wherein the magnet body is produced from an alloy based on $Sm_2(Cu, Zr, Fe, Co)_{17}$.

13. The process according to claim 12, wherein a solder in the form of a powder with at least 50 weight-percent iron is applied to the boundary surface.

* * * * *